(12) United States Patent
Paterson et al.

(10) Patent No.: US 10,116,699 B1
(45) Date of Patent: Oct. 30, 2018

(54) SYSTEMS AND METHODS FOR NETWORK SECURITY

(71) Applicant: United Services Automobile Association (USAA), San Antonio, TX (US)

(72) Inventors: Kevin Glynn Paterson, San Antonio, TX (US); Neelsen Cyrus, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 215 days.

(21) Appl. No.: 15/137,811

(22) Filed: Apr. 25, 2016

Related U.S. Application Data

(60) Provisional application No. 62/181,701, filed on Jun. 17, 2015.

(51) Int. Cl.
  *H04L 29/06* (2006.01)

(52) U.S. Cl.
  CPC .......... *H04L 63/20* (2013.01); *H04L 63/0876* (2013.01); *H04L 63/101* (2013.01); *H04L 63/1408* (2013.01)

(58) Field of Classification Search
  CPC .................... H04L 63/20; H04L 63/0876
  See application file for complete search history.

(56) References Cited

U.S. PATENT DOCUMENTS

| | | | |
|---|---|---|---|
| 9,026,597 B1 * | 5/2015 | Emigh | H04L 1/1685 370/254 |
| 9,055,093 B2 * | 6/2015 | Borders | G06F 21/552 |
| 2005/0198173 A1 * | 9/2005 | Evans | H04L 51/12 709/206 |
| 2006/0242694 A1 * | 10/2006 | Gold | H04L 63/1441 726/13 |
| 2011/0265145 A1 * | 10/2011 | Prasad | H04L 63/1441 726/3 |
| 2012/0276867 A1 * | 11/2012 | McNamee | H04L 12/1407 455/406 |
| 2013/0007058 A1 * | 1/2013 | Meredith | G06F 17/3087 707/770 |
| 2013/0139073 A1 * | 5/2013 | Crames | G06F 9/44505 715/760 |
| 2014/0283109 A1 * | 9/2014 | Quong | G06F 21/10 726/27 |
| 2014/0310358 A1 * | 10/2014 | Pignataro | H04L 51/046 709/206 |
| 2015/0135285 A1 * | 5/2015 | Boro | G06F 7/06 726/5 |

(Continued)

*Primary Examiner* — Ali Shayanfar
(74) *Attorney, Agent, or Firm* — Fletcher Yoder, PC

(57) ABSTRACT

Enhanced electronic security systems and methods are provided. A whitelist, blacklist, or both of resource access sources that are allowed to use a particular resource access account are obtained. Upon detecting an access attempt to a particular resource on a computer network, a source of the access attempt and a resource access account used in the access attempt is identified. The whitelist, blacklist, or both are referenced to determine if the source of the access attempt is allowed to use the resource access account used in the access attempt. When the source of the access attempt is not allowed to use the resource access account used in the access attempt, one or more mitigation tasks may be performed.

18 Claims, 3 Drawing Sheets

(56) References Cited

U.S. PATENT DOCUMENTS

| | | | |
|---|---|---|---|
| 2015/0180829 A1* | 6/2015 | Yu | G06F 21/31 726/11 |
| 2015/0281070 A1* | 10/2015 | Liljenstolpe | H04L 47/10 370/392 |
| 2016/0182454 A1* | 6/2016 | Phonsa | H04L 63/0263 726/11 |
| 2016/0212636 A1* | 7/2016 | Dimou | H04W 56/001 |

* cited by examiner

SYSTEMS AND METHODS FOR NETWORK SECURITY

CROSS REFERENCE TO RELATED APPLICATION

This application claims priority to and the benefit of U.S. Provisional Application No. 62/181,071, entitled "SYSTEMS AND METHODS FOR NETWORK SECURITY," filed Jun. 17, 2015, which is hereby incorporated by reference in its entirety for all purposes.

BACKGROUND

The present disclosure relates generally to network security. More specifically, the present disclosure relates to mitigating risk associated with unauthorized use of resource access accounts.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Generally speaking, embodiments provided herein relate to detecting unauthorized use of accounts useful for accessing one or more resources (e.g., data, computers, etc.) In certain embodiments, a listing of access sources may be generated that provide a list (e.g., a whitelist) of permitted sources that may use an associated resource access account. When a resource access request using the resource access account is sourced from an entity that is not specified in the whitelist, the system may determine that there is an unauthorized use of the resource access account and may provide risk mitigation to protect resources of the system.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The information age has brought about rapid advancements in telecommunication, hardware-based computing, software, and other data related activities. Thus, the current information-based society has resulted in the generation of a vast amount of valuable digital resources that should be protected from public consumption. For example, may organizations may retain a significant amount of personal and/or sensitive digitized data and/or machines within the organizations. Further, organizations have become more connected, utilizing sophisticated networks of computers that, in some cases, may be accessed remotely from a number of access points. Unfortunately, this increased utilization of sensitive resources along with the increase in connectivity/access points to these sensitive resources has increased the risk of unauthorized access to the resources.

Figure 1:
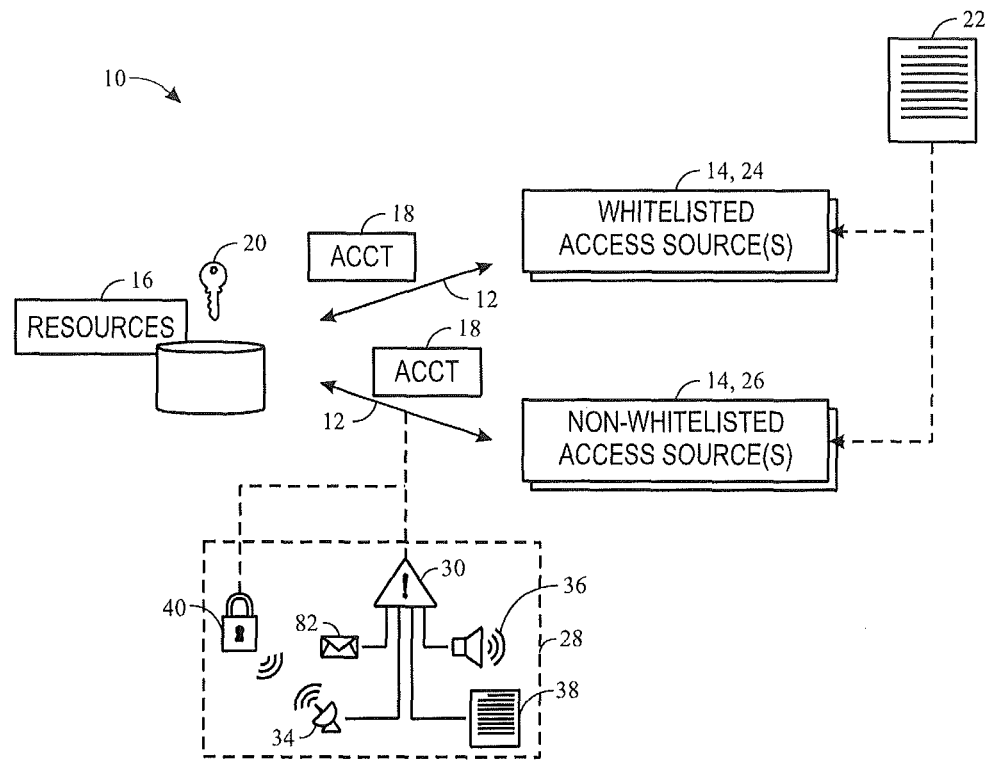
FIG. 1 illustrates a block diagram of a network security risk mitigation system, in accordance with certain embodiments described herein.

Accordingly, as discussed above, new techniques may be implemented to mitigate risk of unauthorized access to one or more resources. By way of introduction, FIG. 1 illustrates a block diagram of a network security risk mitigation system 10, in accordance with certain embodiments described herein. Generally speaking, the network security risk mitigation system 10 may include a computer network 12 that connects access sources 14 to one or more protected resources 16 (e.g., computer systems, file systems, electronic data, etc.). For example, the computer network 12 may, in some embodiments be an Ethernet network (or other computer network technology) that utilizes the Transmission Control Protocol (TCP), Internet Protocol (IP), and/or any other networking protocol.

The access sources 14 may include any number of computing devices such as a general-purpose computer, a mobile computing device, a laptop-computing device, a tablet computing device and the like. The access sources 14 may access the resources 16 using a resource access account 18 that is associated with one or more permissions 20 to access the resource 16. For example, a permission 20 may dictate that the account 18 has read access, write access, or both to the resource 16.

As mentioned above, from time-to-time, the resource access accounts 18 may become compromised. For example, unpermitted sharing of the resource access accounts 18, data breaches of the system 10, or both may lead to unintended possession of the resource access account 18. Thus, additional avenues of protection for such unintended possession may be desirable. Accordingly, a whitelist definition 22 may provide an indication of particular access sources 14 (e.g., whitelisted access sources 24) that may acquire access to the resources 16 using the resource access account 18. Accordingly, the whitelist definition 22 may also indirectly define access sources 14 (e.g., non-whitelisted access sources 26), as any access source 14 not described in the whitelist definition 22 is a non-whitelisted access source 26.

In some embodiments, critical login accounts may be protected using a whitelist definition 22. For example, the resource access accounts 18 may be critical login accounts associated with particular resources 16. Critical login accounts may describe accounts that may be used at a plurality of access sources 14 and/or resources 16, such as all servers running a particular operating system (e.g., Microsoft Windows) in the system 10. These critical login accounts may cause particular vulnerabilities in the system 10, because compromise of a single account may result in unauthorized access of a multitude of resources 16 (e.g., all servers running a particular operating system). Utilizing the techniques mentioned herein, such vulnerabilities may be mitigated. For example, in such embodiments, it may be known that only a select subset of the resource access accounts 18 that have been provisioned with a particular critical login account should actually use the critical login account. Thus, the select subset of the resources accounts 18 may be in the whitelist definition 22, while the other sources may be blacklisted (e.g., not in the whitelist definition 22).

In alternative embodiments, a blacklist definition may be used in place of the whitelist definition 22. For example, the blacklist definition could specifically indicate particular non-whitelisted access sources 26, indirectly defining all other access sources 14 as whitelisted sources 24.

Once the system 10 is aware of the whitelisted access sources, the system 10 may mitigate the risk of unintended possession of resource access accounts 18 by initiating certain risk mitigation tasks 28 upon determining that a non-whitelisted access source 26 is attempting to access (or has accessed) resources 16 via the resource access account 18. For example, in some embodiments, one or more alerts 30 may be generated to provide a notification regarding the unauthorized attempt to access the resources 16. For example, electronic notifications 32, such as email or simple message system (SMS) text messages may be provided to security personnel or other individuals associated with the resources 16. In some embodiments, the alerts 30 may include two-way communications 34, such as cellular telephone calls. Audible and/or visual alerts 36 may also provide an indication of the unauthorized resource access 16. For example, an audible alert may be presented via an intercom system and/or a visual indication may be presented via an overhead lighting system. In some embodiments, the audible and/or visual alerts 36 may be facilitated by use of a graphical user interface (GUI) of a resource 16 monitoring software. In some embodiments, the alert 30 may include one or more reports 38 of recent unauthorized access and/or repeated unauthorized access.

Additionally and/or alternatively, the system 10 may implement mitigation tasks 28 related to security features 40 of the resources 16. For example, in some embodiments, a first attempted access to the resources 16 may be granted despite the request coming from a non-whitelisted access source 26. However, upon subsequent unauthorized access attempts (or after a threshold number of subsequent unauthorized access attempts), the system 10 may: restrict access from the non-whitelisted access sources 26, disable the account 18, or both. In alternative embodiments, access to the resource 16 may be denied immediately upon determining that the access was sourced from a non-whitelisted access source 26.

In some embodiments, the system may redirect access attempts from non-whitelisted access sources 26 to a honeypot. A honeypot is a trap that is used to detect, deflect, or otherwise counteract attempts to commit unauthorized access to the system 10. The honeypot may enable the system 10 and/or personnel associated with system 10 to monitor the access to determine particular characteristics, such as hacking techniques, particular resources 16 that hackers are attempting to access, etc.

In some embodiments, particular security mitigation tasks 28 may be implemented based upon one or more factors of the system 10. For example, when a heightened security mode is initiated in the system 10 and/or the resources 16 being access are sensitive (e.g., personal data rather than anonymized data), more strict mitigation tasks 28 may be used. For example, immediate denial of access to the resources 16 may be implemented rather than providing a threshold of allowed accesses prior to denying access.

Figure 2:
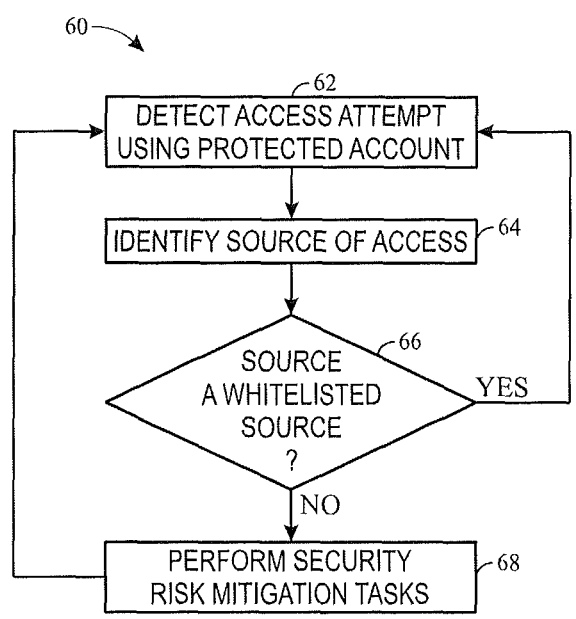
FIG. 2 illustrates a flowchart describing a process for mitigating risk on a computer network, in accordance with certain embodiments described herein.

To perform some of the actions set forth above, one or more unauthorized access monitoring processes may be implemented. FIG. 2 illustrates a flowchart describing a process 60 for mitigating risk on a computer network, in accordance with certain embodiments described herein. The process 60, along with all other processes described herein, may be a machine-implemented process that is implemented by a processor using one or more machine-readable instructions. The machine-readable instructions may be stored on a tangible, non-transitory, machine readable medium.

The process 60 begins by detecting an access attempt using the resource access account (block 62). For example, as mentioned above the resource access account 18 may be critical login accounts that are used across a multitude of sources and/or resources 16.

Access attempts may be determined by the system in a variety of ways. For example, network traffic monitoring may intercept such access requests, the resource (or a host of the resource) being accessed may detect the access attempt, or periodic monitoring of activity logs of the resource and/or a host of the resource may be monitored to observe past access attempts.

Next, the source of the access attempt is identified (block 64). For example, in some embodiments, an Internet Protocol (IP) address may be used to identify the source. Additionally and/or alternatively, a media access control (MAC) address or other available unique identifier associated with the source may be used to identify the source. Further, in some embodiments, additional data may be used to determine particular whitelisted sources 24. In certain embodiments, time thresholds, time ranges, etc. may be used to alter a set of whitelisted access sources 24. For example, a whitelist rule may dictate that a particular access source 14 is whitelisted for use of a particular account 18 (e.g., a critical account login) during a workday (e.g., 8:00 AM-5:00 PM, Monday-Friday), during off-peak hours (e.g., 8:30 PM-6:00 AM), during a particular time period (e.g., 12:01 AM-1:45 AM), etc. Accordingly, the whitelisted access sources 24 may be quite fluid, creating unpredictability for hackers, which may result in strengthening the security of the system 10.

From there, a determination is made as to whether the identified source is whitelisted (e.g., is in the whitelist definition 22 of FIG. 1, is not listed in a blacklist, or both) (decision block 66). For example, a query of a whitelist (e.g., a database, data file, etc.) may search for the IP address, MAC address and/or other available unique identifier used to identify the source of the access attempt.

If the source is whitelisted, monitoring continues (block 62) without any risk mitigation. However, when the query indicates that the source is not defined as a whitelisted access source 24 (e.g., is a non-whitelisted access source 26), one or more risk mitigation tasks may be performed (block 68). For example, as discussed above, one or more alerts 30 may be triggered and/or one or more security 40 features may be activated. Alerts 30 may, in some embodiments, include electronic messages 32, two-way communications 34, audible and/or visual alarms 36, and/or reporting 38. Further the security features 40 may limit access to the resource 16 and/or redirect the access attempt to a honeypot for further observation.

Figure 3:
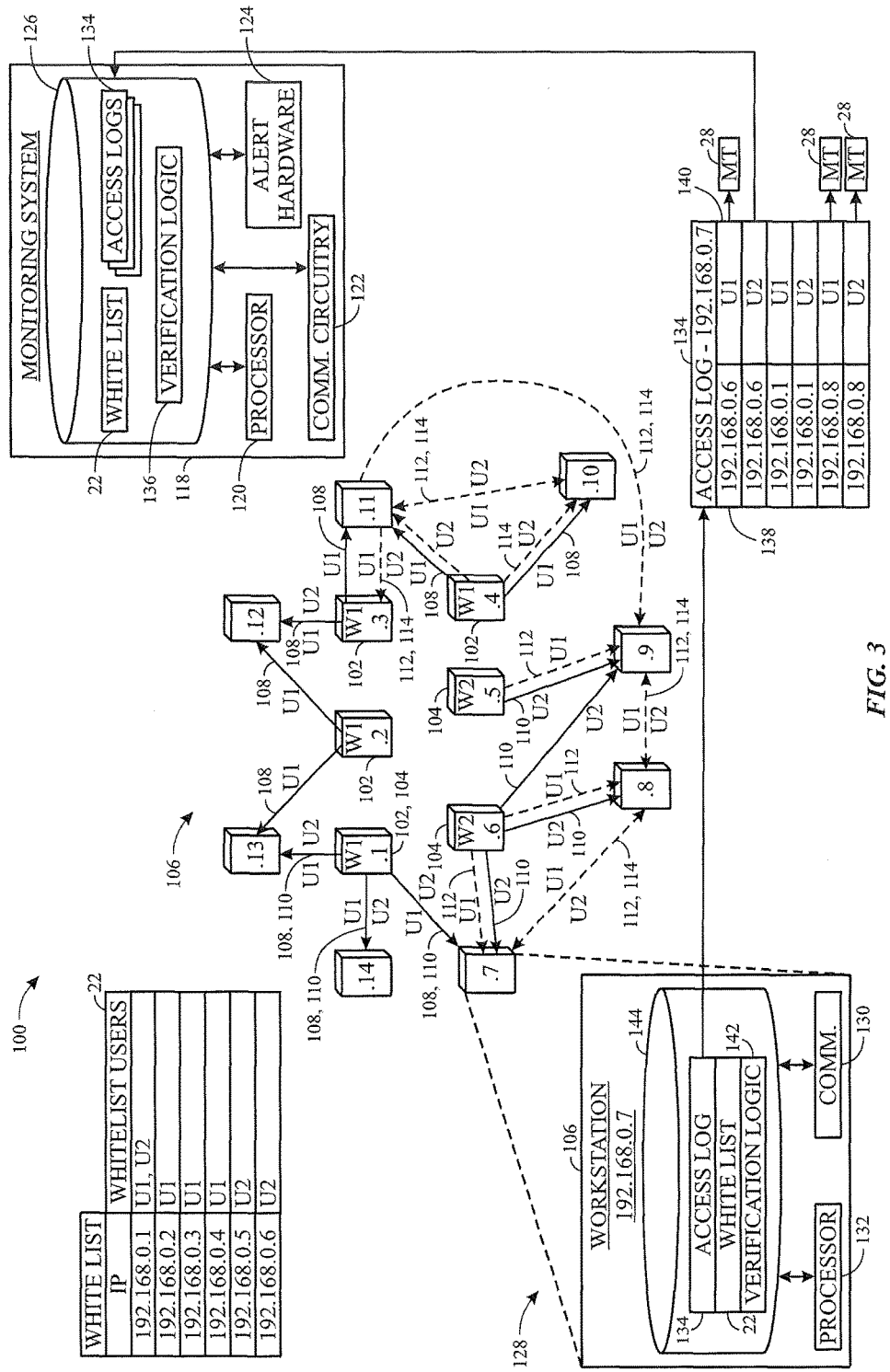
FIG. 3 illustrates an example of a computer network that has implemented the process for mitigating risk, as described in FIG. 2, in accordance with certain embodiments described herein.
Figure 4:
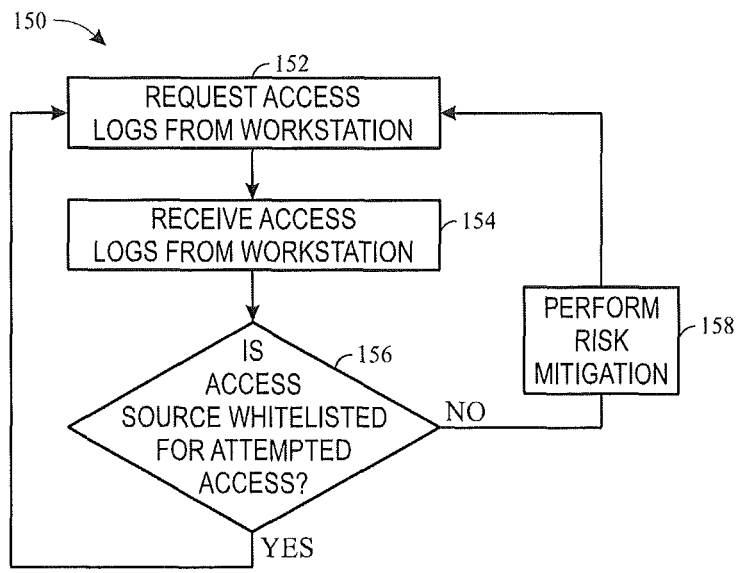
FIG. 4 illustrates a flowchart describing a process for mitigating risk at the monitoring system of FIG. 3, in accordance with certain embodiments.
Figure 5:
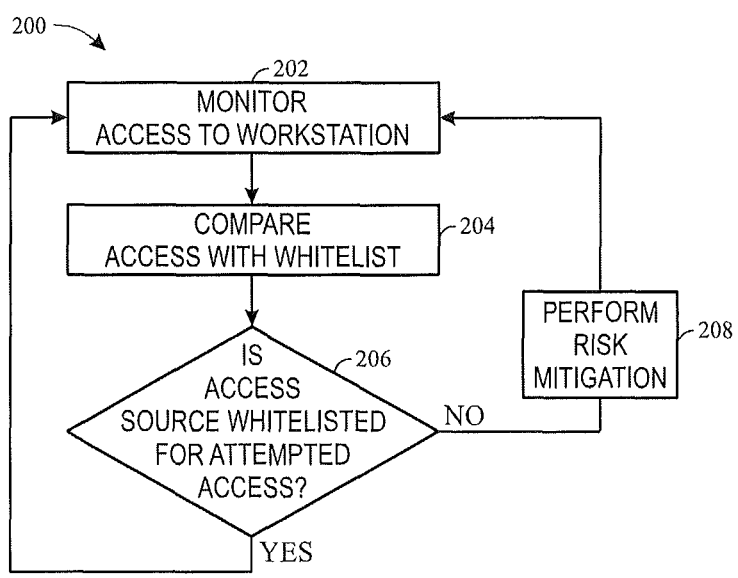
FIG. 5 illustrates a flowchart describing a process for mitigating risk at the workstations of FIG. 3, in accordance with certain embodiments.

Turning now to a more detailed discussion of particular techniques for mitigating risk of unauthorized access of resources, FIG. 3 illustrates an example of a computer network (e.g., system 100) that has implemented the process 60 for mitigating risk of FIG. 2, in accordance with certain embodiments described herein. Multiple systems may monitor and mitigate risks associated with unauthorized access. FIG. 4 illustrates a flowchart describing a process for mitigating risk at the monitoring system of FIG. 3, in accordance with certain embodiments. Additionally and/or alternatively, FIG. 5 illustrates a flowchart describing a process for mitigating risk at the workstations of FIG. 3, in accordance with certain embodiments. For simplicity, FIGS. 3-5 will be discussed together.

As previously discussed, the system 10 of FIG. 1 may include whitelisted sources 24 and non-whitelisted sources 26. For simplicity, the discussion in FIG. 1 revolved around a single account 18 with associated whitelisted access sources 24. However, in some embodiments, additional accounts may be present, these accounts sharing the same whitelisted access sources or having an independent set of whitelisted access sources. In the system 100, two protected user accounts "U1" and "U2" are monitored in accordance with the process 60 of FIG. 2. Protected user accounts "U1" and "U2" include separate whitelisted sources, which are defined in the whitelist definition 22. For example, the whitelist definition 22 may be a data base or data file that indicates that IP addresses 192.168.0.1-192.168.0.4 are whitelisted access sources 102 for usage of protected user account "U1." Additionally the whitelist definition 22 indicates that IP addresses 192.168.0.1, 192.168.0.5, and 192.168.0.6 are whitelisted access sources 104 for protected user account "U2." To illustrate, the workstations 106 have been labeled with the last number associated with the workstation's IP address, where each of the workstations 106 have a IP address leading with 192.168.0. Accordingly, the workstation 106 labeled "0.1" refers to the workstation 106 having the IP address 192.168.0.1.

The communication arrows between each of the workstations 106 indicate whether the access request will invoke risk mitigation tasks. For example, a solid directional arrow having an associated "U1" (e.g., arrow 108) illustrates that no mitigation tasks will be invoked by requesting access using the "U1" account from the workstation 106 at the base of the arrow to the workstation 106 at the tip of the arrow. Likewise, a solid directional arrow having an associated "U2" illustrates that no mitigation tasks will be invoked by requesting access using the "U2" account from the workstation 106 at the base of the arrow to the workstation 106 at the tip of the arrow. Broken directional arrows having an associated "U1" (e.g., arrow 112) illustrate that mitigation tasks will be invoked by requesting access using the "U1" account from the workstation 106 at the base of the arrow to the workstation 106 at the tip of the arrow. Likewise, broken directional arrows having an associated "U2" (e.g., arrow 114) illustrate that mitigation tasks will be invoked by requesting access using the "U2" account from the workstation 106 at the base of the arrow to the workstation 106 at the tip of the arrow.

Thus, for example, in accordance with the process 60 of FIG. 2, transactions from workstations 106 will be monitored according to the whitelist definition 22. Some workstations 106 are white listed for use of one protected user account, but not the other. For example, transactions sourced by the workstation 106 labeled 0.2 using protected user account "U1" will not trigger mitigation tasks, because 192.168.0.2 is whitelisted for use of "U1." However, if this workstation attempted to gain access to a resource using "U2," a mitigation task would be triggered, because 192.168.0.2 is not white listed for use of "U2."

In some scenarios particular workstations may be whitelisted for use of multiple or all accounts. For example the workstation 106 labeled 0.1 is whitelisted for use of both accounts "U1" and "U2." Accordingly, any access requests sourced from this workstation using either "U1" or "U2" will not result in mitigation tasks.

Sometimes, particular workstations 106 are not whitelisted for use of any accounts. For example, the workstation labeled 0.9 is not whitelisted to use either "U1" or "U2." Accordingly, any access request sourced from this workstation 106 using "U1" or "U2" will trigger a mitigation task.

The system 100 also includes a monitoring system 118. The monitoring system 118 may track workstations 106 for security violations, performance, etc. to ensure efficient and protected operation of the workstations 106. The monitoring system 118 may include a processor 120, communications circuitry 122, alert hardware 124, and/or tangible, non-transitory storage 126. As previously discussed, the workstations 106, the monitoring system 118, or both may provide the whitelist monitoring functionality. FIG. 4 illustrates a flowchart describing a process 150 for mitigating risk at the monitoring system 118 of FIG. 3, in accordance with certain embodiments. The process 150 may begin by requesting access logs from one or more of the workstations 106 (block 152). In some embodiments, it may be preferable to obtain access logs for each of the workstation in the system. Referring back to FIG. 3, the monitoring system 118 may provide the request via communication circuitry 122 to the workstations 106. As indicated by the expanded detail 128 of the workstation 106 having the IP address 192.168.0.7, the workstations 106 may include communications circuitry 130 and a processor 132 that may facilitate the provision of access logs 134 to the monitoring system 118. The access logs 134 may be received by the monitoring system 118 (block 154).

The monitoring system 118 may have access to a copy of the whitelist definition 22. For example, as illustrated in FIG. 3, a copy of the whitelist definition 22 is stored in the storage 126. In certain embodiments, the monitoring system 118 may use the processor 120 and/or communications circuitry 122 to obtain the whitelist definition 22 from an external source.

Verification logic 136 (e.g., instructions implemented by the processor 120) may determine if the sources 138 and user accounts 140 provided in the access logs 134 correlate to whitelisted sources (decision block 156). For example, in the expanded access log of the workstation 106 having IP address 192.168.0.7, the verification logic may determine that the access attempt from 192.168.0.6 using "U1" and the access attempt from 192.168.0.8 using both "U1" and "U2" should trigger mitigation tasks 28. Accordingly, mitigation tasks may be performed when the access source is not whitelisted (block 158). Otherwise, monitoring may periodically be re-implemented (starting at block 152).

Additionally and/or alternatively, FIG. 5 illustrates a flowchart describing a process 200 for mitigating risk at the workstations 106 of FIG. 3, in accordance with certain embodiments. In such embodiments, the process 200 begins by monitoring access to the workstation 106 (block 202). For example, the workstations 106 may use their own locally stored access logs 134 and/or incoming data packets (e.g., external data accessing the communication circuitry 130) to determine if non-whitelisted access sources are attempting to access the workstation 106.

Upon identifying the access source (e.g., via the sources 138 of access log 134 or an identifying signature in the incoming data packets) and the account 18 being used to attempt access, the workstations 106 may compare the access source identity and account with the whitelist definition 22 (block 204). The whitelist definition 22 may be stored locally at the workstation 106 or may be downloaded and/or accessed remotely (e.g., via the communication circuitry 130).

Verification logic 142 (e.g., processor 132-implemented instructions stored in tangible, non-transitory storage 144 may determine if the access source is whitelisted for the attempted access (decision block 206). For example, the verification logic may query the whitelist definition 22 for the particular source identity and account combination. If the access source is whitelisted, monitoring may continue (block 202).

Otherwise, if the access source is not whitelisted, mitigation tasks may be performed (block 208). In some embodiments, the mitigation tasks may trigger a command to perform an activity on a separate machine. For example, the workstation 106 may command an alert to be presented at the monitoring system 118 (e.g., via the alert hardware 124, such as a display for visual alerts and/or a speaker for audible alerts).

As may be appreciated, by applying the techniques provided in processes 60, 150, and/or 200, awareness of network access and security may be enhanced. Indeed, these techniques may provide increased security by including an additional layer of monitoring that hackers may be unable to detect. By keeping the whitelist definition secret, hackers and others attempting unauthorized access will not know which servers are whitelisted. Additionally, use of particular accounts (e.g., critical login accounts) from a particular source may be whitelisted for a particular time (e.g., a time range (e.g., 12:00 AM-6:30 AM), duration (e.g., 3 hours from the beginning of the whitelisting), etc. Further, from time to time (e.g., daily, weekly, monthly, etc.) the whitelist definition may be altered, such that the whitelisted servers remain undetectable. Thus, unauthorized users will be unable to circumvent attempted access from non-whitelisted sources. Accordingly, as access is attempted from these non-whitelisted sources, these perpetrators may be quickly discovered and mitigation measures may be implemented.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A computer-implemented method, comprising:
    obtaining a whitelist of resource access sources that are allowed to use a particular resource access account to access a particular resource on a computer resource;
    detecting an access attempt to the particular resource;
    identifying a source, from which the access attempt originated, and a resource access account used in the access attempt;
    determining, by referencing the whitelist, if the source, from which the access attempt originated, is allowed to use the resource access account used in the access attempt; and
    performing one or more mitigation tasks if the source, from which the access attempt originated, is not allowed to use the resource access account used in the access attempt, wherein the one or more mitigation tasks comprises restricting access to the particular resource by the source, from which the access attempt originated, only after a threshold number of access attempts are performed by the source, from which the access attempt originated, using the resource access account.

2. The computer-implemented method of claim 1, comprising:
    performing the one or more mitigation tasks by:
        providing an electronic message indicating a non-whitelisted access attempt;
        providing a two-way communication message indicating the non-whitelisted access attempt;
        providing an audible alarm, a visual alarm, or both indicating the non-whitelisted access attempt; and
        providing a report indicating the non-whitelisted access attempt; or
        any combination thereof.

3. The computer-implemented method of claim 1, comprising:
    performing the one or more mitigation tasks by:
        redirecting access to the particular resource to a honeypot, the honeypot comprising a trap that is used to detect, deflect, counteract or any combination thereof unauthorized access to the particular resource.

4. The computer-implemented method of claim 1, wherein the whitelist comprises a permitted time period as to when at least one of the resource access sources are allowed to use the particular resource access account; and
    wherein the method comprises:
        determining, by referencing the whitelist, if the source, from which the access attempt originated, is allowed to use the resources access account at a particular time based upon the permitted time period; and
        performing the one or more mitigation tasks if the source, from which the access attempt originated, is not allowed to use the resource access account at the particular time.

5. The computer-implemented method of claim 1, comprising:

identifying the source by determining an Internet Protocol (IP) address of the source.

6. The computer-implemented method of claim 1, comprising:
identifying the source by determining a media access control (MAC) address or other available unique identifier associated with the source.

7. The computer-implemented method of claim 1, wherein the computer-implemented method is implemented by a host computer comprising the particular resource.

8. The computer-implemented method of claim 1, wherein the computer-implemented method is implemented by a monitoring system separate from a host computer comprising the particular resource.

9. A workstation, comprising:
a processor, configured to:
detect an access attempt to the workstation from a resource access source;
access:
a whitelist, comprising an indication of resource access sources that are allowed to use a particular resource access account to access the workstation,
a blacklist, comprising an indication of resource access sources that are not allowed to use the particular resource access account to access the workstation, or
both;
determine if the resource access source that attempted to access the workstation used a permitted account in the access attempt, by referencing the whitelist, the blacklist, or both;
perform one or more mitigation tasks if the resource access source that attempted to access the workstation did not use a permitted account in the access attempt, wherein the one or more mitigation tasks comprises restricting access to the workstation by the resource access source that attempted to access the workstation only after a threshold number of access attempts are performed by the resource access source without using a permitted account; and
provide access to the workstation from the resource access source that attempted to access the workstation when the resource access source used a permitted account in the access attempt.

10. The workstation of claim 9, comprising the whitelist stored on the workstation, wherein the whitelist is altered periodically, such that the resources access sources that are allowed to use the particular resource access account to access the workstation remain undetectable over time.

11. The workstation of claim 9, wherein the processor is configured to access the whitelist from a database.

12. The workstation of claim 9, wherein the processor is configured to access the blacklist.

13. The workstation of claim 9, wherein the processor is configured to determine if the resource access source that attempted to access the workstation used a permitted account in the access attempt at a particular permitted time, by referencing the whitelist, the blacklist, or both; and
wherein the whitelist, the blacklist, or both provides an indication of the particular permitted time.

14. A monitoring system, comprising:
a processor configured to:
request access logs from one or more workstations, the access logs comprising a set of access sources that have attempted to access one or more resources and corresponding resource access accounts used by the set of access sources in an attempt to access the one or more resources;
receive the access logs from the one or more workstations;
determine, by referencing a whitelist, a blacklist, or both, if, during the attempt to access the one or more resources, any access source of the set of access sources, from which the attempt to access the one or more resources originated, used an account that was not whitelisted for the access source; and
perform one or more mitigation tasks if any access source of the set of access sources, from which the attempt to access the one or more resources originated, used accounts that were not whitelisted for the access source, wherein the one or more mitigation tasks comprises restricting access to the one or more resources by a particular access source of the set of access sources, from which the attempt to access the one or more resources originated, when a threshold number of access attempts were performed the particular access source using one or more particular accounts that were not whitelisted for the particular access source.

15. The monitoring system of claim 14, wherein the processor is configured to:
determine, by referencing the whitelist, the blacklist, or both, if any one of the set of access sources attempted to access the one or more resources at an unpermitted time; and
perform the one or more mitigation tasks when any one of the set of access sources attempted to access the one or more resources at the unpermitted time.

16. The monitoring system of claim 14, wherein the processor is configured to:
determine permitted times of use of the corresponding resource access accounts to access the one or more resources; and
perform the one or more mitigation tasks when an access attempt for the one or more resources used the corresponding resource access accounts outside of the permitted times.

17. The monitoring system of claim 14, wherein the processor is configured to:
request access logs from a plurality of workstations; and
receive the access logs from the plurality of workstations; and
wherein the whitelist, the blacklist, or both, is common for the plurality of workstations.

18. The monitoring system of claim 14, wherein the processor is configured to:
perform the one or more mitigation tasks by:
providing an electronic message indicating a non-whitelisted access attempt;
providing a two-way communication message indicating the non-whitelisted access attempt;
providing an audible alarm, a visual alarm, or both indicating the non-whitelisted access attempt;
providing a report indicating the non-whitelisted access attempt; or
any combination thereof.

* * * * *

UNITED STATES PATENT AND TRADEMARK OFFICE
CERTIFICATE OF CORRECTION

PATENT NO. : 10,116,699 B1
APPLICATION NO. : 15/137811
DATED : October 30, 2018
INVENTOR(S) : Kevin Glynn Paterson et al.

Page 1 of 2

It is certified that error appears in the above-identified patent and that said Letters Patent is hereby corrected as shown below:

On the Title Page

Item [60], under "Related U.S. Application Data", in Column 1, Line 1, delete "62/181,701," and insert -- 62/181,071, --, therefor.

In the Specification

Column 1, Line 55, delete "DRAWINGS" and insert -- BRIEF DESCRIPTION OF THE DRAWINGS --, therefor.

Column 2, Lines 35-36, delete "may organizations" and insert -- many organizations --, therefor.

Column 3, Lines 49-50, delete "simple message system (SMS)" and insert -- short message service (SMS) --, therefor.

Column 5, Line 50, delete "data base" and insert -- database --, therefor.

Column 7, Line 36, delete "storage 144" and insert -- storage 144) --, therefor.

Column 7, Line 62, delete "etc." and insert -- etc.) --, therefor.

In the Claims

Column 8, Line 60, Claim 4, delete "resources access account" and insert -- resource access account --, therefor.

Column 9, Line 27, Claim 9, delete "both;" and insert the same at Line 26, after "or" as a continuation sub-point.

Signed and Sealed this
Ninth Day of July, 2019

Andrei Iancu
*Director of the United States Patent and Trademark Office*

Column 9, Line 47, Claim 10, delete "resources access sources" and insert -- resource access source --, therefor.